(12) United States Patent
Filho

(10) Patent No.: US 12,006,029 B2
(45) Date of Patent: Jun. 11, 2024

(54) VERTICAL TAKE-OFF AND LANDING COCOON-TYPE FLYING VEHICLE

(71) Applicant: Alberto Carlos Pereira Filho, Sao José dos Campos (BR)

(72) Inventor: Alberto Carlos Pereira Filho, Sao José dos Campos (BR)

( * ) Notice: Subject to any disclaimer, the term of this patent is extended or adjusted under 35 U.S.C. 154(b) by 208 days.

(21) Appl. No.: 17/624,480

(22) PCT Filed: Jul. 3, 2019

(86) PCT No.: PCT/BR2019/050247
§ 371 (c)(1),
(2) Date: Jan. 3, 2022

(87) PCT Pub. No.: WO2021/000028
PCT Pub. Date: Jan. 7, 2021

(65) Prior Publication Data
US 2022/0355922 A1    Nov. 10, 2022

(51) Int. Cl.
*B64C 29/00*   (2006.01)
*B64C 13/04*   (2006.01)
(Continued)

(52) U.S. Cl.
CPC ...... *B64C 29/0008* (2013.01); *B64C 13/0421* (2018.01); *B64C 25/36* (2013.01); *B64D 27/24* (2013.01); *B64D 29/00* (2013.01)

(58) Field of Classification Search
CPC ............ B64C 29/0008; B64C 29/0016; B64C 39/026; B64C 11/001; B64C 27/20
See application file for complete search history.

(56) References Cited

U.S. PATENT DOCUMENTS

| 3,314,628 | A | 4/1967 | Mayers |
| 6,488,232 | B2 * | 12/2002 | Moshier ............... B64C 39/026 |
| | | | 244/4 A |

(Continued)

FOREIGN PATENT DOCUMENTS

| CN | 105835038 A | 8/2016 |
| DE | 2628274 A1 | 1/1978 |

(Continued)

OTHER PUBLICATIONS

International Search Report, National Institute of Industrial Property, Aug. 7, 2019.

*Primary Examiner* — Richard G Davis
(74) *Attorney, Agent, or Firm* — The Roy Gross Law Firm, LLC; Roy Gross

(57) ABSTRACT

An innovative capsule type flying vehicle with vertical takeoff and landing, which belongs to the field of devices for air transportation, preferably used for individual transportation, but optionally can be configured for the transportation of two people, where the great inconvenience of products of the same purpose found in the state of technology is the fact that they leave the user exposed and unprotected; differently, the object of this present request consists of a propelled flying vehicle having an aerodynamic envelope and structure, shaped as an ogive capsule, manufactured using light, reliable, safe and easily controllable material, capable of taking off and landing vertically and hovering, flying and maneuvering over great distances and altitudes; consisting of a pod-shaped capsule (1) formed by a base (2), head (3), entry door (4) with a windshield (4A) and a support to fix the propulsion engine.

7 Claims, 4 Drawing Sheets

Figure 1:
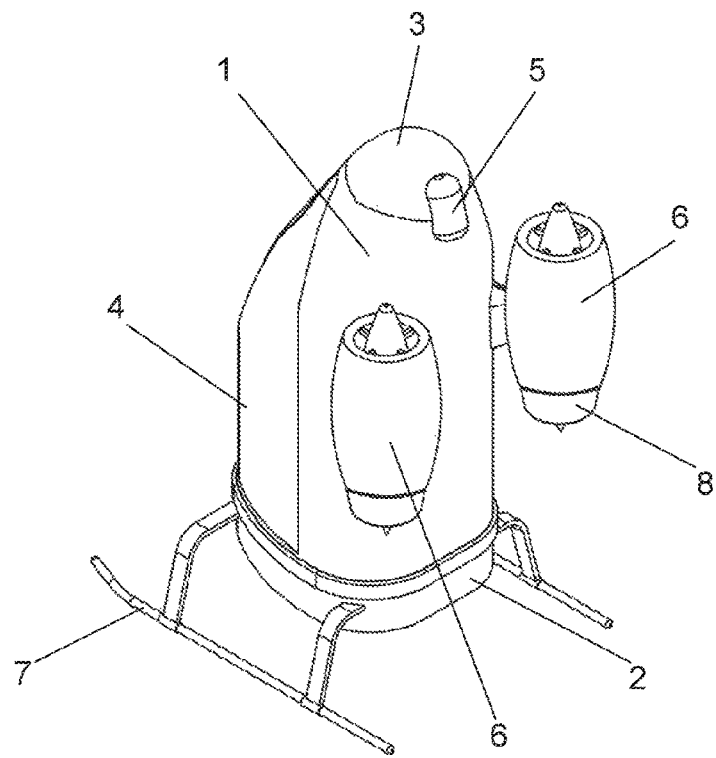

(51) Int. Cl.
    *B64C 25/36*     (2006.01)
    *B64D 27/24*     (2006.01)
    *B64D 29/00*     (2006.01)

(56) References Cited

U.S. PATENT DOCUMENTS

| | | | |
|---|---|---|---|
| 6,854,686 B2* | 2/2005 | Perlo | B64C 39/026 244/7 B |
| 2002/0113165 A1* | 8/2002 | Moshier | B64C 39/026 244/4 A |
| 2006/0196991 A1* | 9/2006 | Martin | B64C 39/026 244/4 A |
| 2010/0025540 A1 | 2/2010 | Castoldi | |
| 2011/0133037 A1* | 6/2011 | Martin | B64C 15/02 244/4 A |
| 2015/0197337 A1* | 7/2015 | Tsunekawa | B64C 27/20 244/23 A |
| 2017/0015419 A1* | 1/2017 | Tyler | B64D 17/40 |
| 2018/0162552 A1* | 6/2018 | Vawter | B64C 39/024 |
| 2018/0334252 A1* | 11/2018 | Lin | B64D 35/04 |
| 2021/0001983 A1* | 1/2021 | Fredsted | B64C 39/026 |

FOREIGN PATENT DOCUMENTS

| | | |
|---|---|---|
| RU | 2571153 C1 | 12/2015 |
| WO | 2011002517 A2 | 1/2011 |

* cited by examiner

VERTICAL TAKE-OFF AND LANDING COCOON-TYPE FLYING VEHICLE

CROSS REFERENCE TO RELATED APPLICATION

This application is for entry into the U.S. National Phase under § 371 for International Application No. PCT/BR2019/050247 having an international filing date of Jul. 3, 2019, and from which priority is claimed under all applicable sections of Title 35 of the United States Code including, but not limited to, Sections 120, 363, and 365(c).

FIELD OF INVENTION

The object of this present invention patent is a capsule type flying vehicle with vertical takeoff and landing, belonging to the field of artifacts for air transportation, preferably for individual transportation, but which may be optionally configured for the transportation of two people.

More specifically, the capsule type flying vehicle with vertical takeoff and landing consists of a propelled flying vehicle, having an aerodynamic envelope and structure, in the shape of an ogive, manufactured using light, reliable, safe and easily controllable material, which accommodates one or optionally two people in its interior. Equipped with jet propulsion or electric motors as an added feature, it is capable of displacing itself at high speeds and reach an altitude of around three kilometers, is capable of taking off and landing vertically, hover, fly and maneuver along great distances and altitudes.

Therefore, in the patent request in question, an air transportation vehicle specially designed and developed to achieve great practicality and offer numerous advantages, both in its use as well as in its manufacturing, is hereby requested.

This concept has been present in science fiction for almost a century and became widespread during the 1960s. Real jet packs have been developed using a variety of mechanisms, but their uses are much more limited than their fiction counterparts due to the challenges imposed by earth's atmosphere, gravity, low density of available fuel energy and the human body not being suitable for flying, where such packs are mainly used for aerobatics. One practical use for jet packs has been in astronaut extravehicular activities.

In more general terms, a jet pack is a wearable device that allows the user to fly by providing traction. Except when used in a microgravity environment, this traction must be upwards in order to overcome the force of gravity and must be sufficient to overcome the weight of the jet pack, its fuel and the user. This necessarily requires a bit more power to continuously push this mass in various directions.

This free flight requires that fuel be transported within the pack. This results in problems related to the global ratio in mass, which limits the maximum flight time. Therefore, more efficient engines are fundamental for this equipment to be successful.

State of Technology

Technical experts in this area are aware that, traditionally, there are personal air transportation vehicle models of various forms and concepts.

In this respect and with the purpose of precisely defining the state of technology, some patent documents must be mentioned that describe equipment having the same conceptual purposes, but do not achieve the inventive merit and differentials herein revealed, as described hereinafter.

Patent document U.S. Pat. No. 7,900,867B2, entitled "PERSONAL PROPULSION DEVICE"; reveals a personal propulsion device including the body unit having a center of gravity, where the body unit includes a thrust assembly providing a main conduit in fluid communication with at least two thrust nozzles, with the thrust nozzles located above the body unit's center of gravity. The thrust nozzles are independently pivotable about a transverse axis located above the center of gravity, and may be independently controlled by a single common linkage. This invention may further include a base unit containing an engine and a pump, which supplies pressurized fluid to the body unit through a delivery conduit in fluid communication with the base unit and the thrust assembly.

Patent document U.S. Pat. No. 3,570,785, entitled "PERSONAL PROPULSION UNIT"; refers to a monopropellant propulsion system which is used as an assist unit to augment an astronaut's jumping ability on the lunar surface. The unit is composed of a tubular framework which fits onto the shoulders of an astronaut and supports a disposable propellant tank adjacent to the astronaut's chest and has thrusters adjacent to each side of the astronaut about at the level of the hips. Propellant lines are contained within the tubular framework. Controls are provided for tilting the thrusters toward the front and back as well as for throttling the thrusters. Extensions may be added to the tubular framework to achieve different configurations, such as would be suitable for cargo handling.

Patent document U.S. Pat. No. 2,461,347, entitled "HELICOPTER ATTACHED TO THE PILOT"; refers to an aircraft, more particularly a helicopter type aircraft, conceived to support air and be supported on ground by the operator or pilot. An important object of the invention is to provide, in an aircraft, an arrangement of elements capable of being intimately associated with the operator so that in flight and on the ground the one supports the other without discomfort or material interference of other activities of the operator.

Patent document U.S. Pat. No. 3,023,980A, entitled "PROPULSION UNIT"; reveals means of propulsion of an individual and refers to, more particularly, to a means that can be quickly and easily applied and that can provide a propelling force to lift an individual from the ground and thrust this individual to a remote location. It is a primary concern with regard to this present invention to provide such means in the form of a safe, reliable and easily controllable rocket propulsion system, with total impulse to lift and thrust an individual to distances of up to around two or three miles.

Patent document U.S. Pat. No. 3,023,980, entitled "TURBO FAN LIFT DEVICE"; reveals means for rendering persons airborne, and refers to a turbo-fan lift device featuring maximum degrees of simplicity, reliability and maneuverability. The purpose of this invention is based on the need to provide a personal lifting device of relatively low weight and low cost that can be easily assembled and disassembled, and can be easily started by the operator. Another purpose of this invention is to supply new means of lifting that impose a maximum acceleration value, both in the vertical as well as in the horizontal direction and, besides being highly reliable and maneuverable, does not have serious environmental limitations.

Patent document U.S. Pat. No. 3,149,798, entitled "INDIVIDUAL FLIGHT DEVICE"; reveals a harness adapted to be attached to the user's torso, whereby considerable weight savings is achieved by building the harness using light material and employing a joint fuel feeding system which eliminates the feed pressure and thereby allows the fuel to be contained within a light recipient widely supported by the harness itself. In other words, the harness is preferably built so as to form a pocket or pouch, which in turn receives a flexible bag or similar to contain the fuel. Besides this, the objective of this invention is to supply a new fuel feed system in propulsion units, where the fuel is fed through a pump driven by a turbine in which the turbine is connected by means of a small catalyst bed in order to bleed the pump that feeds the fuel once the system is powered when started.

Patent document U.S. Pat. No. 3,243,144, entitled "PERSONAL PROPULSION UNIT"; discloses a propulsion unit for individuals which comprises a pivotally articulated airframe consisting essentially of two components, a corset assembly to which the individuals body is secured and which serves as an entity for mounting the heavier components of the assemblage, and a cross arm assembly provided with shoulder-engaging means and being articulately connected to the corset assembly. By virtue of the connection, the shoulder engaging component which carries the propulsion means is capable of being controlled by the shoulder-engaging component.

Patent document U.S. Pat. No. 3,381,917, entitled "PERSONAL FLYING DEVICE"; anticipates a device capable of transporting one person and/or other loading in free flight. More particularly, the invention is directed to such a device in which the lifting and propelling forces are produced by thrust reactions of fluid streams issuing from one or more nozzles.

Patent document U.S. Pat. No. 3,474,987, entitled "Helicopter device"; reveals a helicopter device of the harness or platform type for transporting a single person through the air, having a supporting structure to carry a single person, connected to a second structure having a power unit with controls to direct movement of the person vertically and forward as desired. Interposed between the supporting structures is a universal type arrangement which permits the rotation of the person in either a vertical or a prone position. The device includes control of both the movement of the person in the two positions and in addition the control of the operation of the power unit and control system to guide the device through the air.

Patent document U.S. Pat. No. 3,556,438, entitled "AIRBORNE VEHICLE"; reveals an aircraft for transporting a single person through the air, comprises a cradle for supporting that person, and a pair of electrically operated fan assemblies operatively connected to the cradle. The orientation of the fan assemblies is controlled from a console accessible to the passenger, thereby to control the flight of the aircraft. Means are provided to move the fans to an inoperative position in which they extend to the rear of the cradle and are disposed in an overlying relationship with respect to one another.

Patent document U.S. Pat. No. 3,586,263, entitled "KINESTHETICALLY CONTROLLED HELICOPTER"; reveals a kinesthetically controlled helicopter that has a lightweight platform for supporting a man and handlebars with controls. A single rotor restrained by a stiff hinge has foldable rotor blades which are driven by a motor with appropriate gearing. The rotor may be arranged above the platform or below the platform. The position of the blade will dictate the particular elements that are folded. A tail rotor on a tail boom is controlled from the handlebars as is the motor. A landing gear includes foldable legs. The helicopter may thus be foldable into a compact structure and is lightweight enough for manual portability.

Patent document U.S. Pat. No. 5,779,188, entitled "FLIGHT DEVICE"; reveals a flight vehicle wherein the flight vehicle can be joined and strapped firmly to a human pilot. The flight vehicle comprises a supporting frame for attaching to the pilot, a driving arrangement incorporating a piston engine, and which is connected directly to the shrouded propeller by means of a rotating drive shaft for the purpose of setting up an air stream, also at least two jet pipes which open into outlet nozzles mounted laterally alongside the load or the human pilot, whereby the said outlet nozzles can be adjusted to change the direction of the air stream. It is by means of the outlet nozzles that the lift force is set up. This latter force enables the human pilot to lift off the ground to make hover or translatory flights.

Patent document U.S. Pat. No. 6,488,232B2, entitled "SINGLE PASSENGER AIRCRAFT"; discloses a single passenger aircraft configured to vertically take-off and land. An airframe is configured to support the passenger in an upright position during take-off and landing and during flight. The aircraft includes a pair of propulsion devices that are mounted on an airframe above the level of the pilot. A set of hand operated control devices are mechanically linked to the propulsion devices for varying the orientation of the propulsion devices during flight.

Patent document U.S. Pat. No. 3,150,847, entitled "JET VEST"; discloses an anti-gravitational device, and more particularly a portable propulsion system controlled by one user Patent document U.S. Pat. No. 8,695,916B2, entitled "PERSONAL FLIGHT VEHICLE INCLUDING CONTROL SYSTEM"; reveals a personal flight device that includes a housing securable to the pilot. The device includes at least one pair of ducted fans, one fan of each pair mounted to each side of the housing. The axis of rotation of each fan is fixed relative to the housing. At least one engine is mounted on the housing for driving the fans and both fans rotate in the same direction for producing thrust. Three pairs of control surfaces, with one control surface of each pair is mounted below each fan of the one or each pair of fans.

Patent document U.S. Pat. No. 8,608,103B2, entitled "PERSONAL FLIGHT DEVICE INCORPORATING RADIATOR COOLING PASSAGE"; discloses a personal flight device which includes a housing for a pilot having at least one pair of ducted fans mounted to one side of the housing, the other fan of at least one pair of ducted fans mounted to the other side of the housing. Each fan rotates about an axis of rotation so as to draw air through the corresponding duct from an entry end of the duct to an exit end of the duct. At least one radiator is also provided. Each engine is cooled by a radiator. Each radiator is associated with at least one passage having an entry end in communication with one surface of the radiator and an exit end adjacent the entry end of one duct of the ducted fans.

Patent document U.S. Pat. No. 7,484,687B2, entitled "PROPULSION DEVICE"; discloses a personal flight device which consists of a housing securable to a pilot, at least one pair of fans, and at least one engine mounted on the housing for driving the fans. One fan is mounted to one side of the housing and the other fan is mounted to the other side of the housing. Both fans rotate in the same direction for producing thrust.

Patent document WO2011002517A2, entitled "TURBINE POWERED PERSONAL FLIGHT SYSTEM"; discloses a turbine, powered mini or micro turbine. The personal flight system is configured as a jet pack, includes a frame having an aerodynamic shell positioned on the system. At least two turbine powered engines, mini or micro turbines, are positioned on opposite sides of the frame. The engines may be covered by aerodynamic nacelles. The jet pack is further configured such that an individual pilot can place the jet pack on the back. Positioned within the shell are fuel cells, fuel pumps, and valves for energizing the engines.

Patent document UK Patent 2559971B, entitled "WEARABLE SYSTEM WITH PROPULSION ASSEMBLIES USED ON THE USER'S BODY"; discloses a device that allows the individual to fly. In particular, the invention refers to the provision of propulsion assemblies that can be maintained in the hands of a user or used on the user's forearms and supply thrust to lift the user off the ground.

Patent document US 2019/0152602A, entitled "PERSONAL FLIGHT VEHICLE"; reveals a personal flight vehicle including a platform base assembly that provides a surface upon which the feet of an otherwise free-standing person are positionable, and including a plurality of axial flow propulsion systems positioned about a periphery of the platform base assembly. The propulsion systems generate a thrust flow in a direction substantially perpendicular to the surface of the platform base assembly, where the thrust flow is unobstructed by the platform base assembly. The thrust flow has a sufficient intensity to provide vertical takeoff and landing, flight, hovering and locomotion maneuvers. The vehicle allows the pilot to control the spatial orientation and movement of the platform base assembly.

Patent document U.S. Pat. No. 4,447,024, entitled "Airborne Vehicle"; reveals a pulpit-like vehicle that is sustained in flight solely by thrust from a jet engine and directionally controlled by shifting the center of gravity of the vehicle relative to the thrust axis of the engine. In accordance with the present invention, thrust of a fanjet engine provides direct lift to an airborne vehicle. The engine is mounted vertically in the vehicle with respect to a fore and aft plane but at a forward leaning angle of approximately 12 degrees with respect to a vertical lateral plane. The exhaust outlet of the engine has a bend of 12 degrees relative to the internal thrust line of the engine in order to direct the jet discharge thereof straight downwardly to facilitate vertical lift.

Insufficient Points of the State of Technology

The flight equipment models of the jet pack type of the state of technology present various configurations, but none in the form of a pod or capsule as presented in this patent request. Practically all use two propulsion systems for greater stability or due to the need of greater propulsion, as is the case of the jet packs consisting of mini-turbines on the user's back.

The main inconvenience of these models is leaving the user exposed and unprotected.

In particular, the inconveniences of the model revealed in patent document U.S. Pat. No. 8,608,103B2, which has a double propulsion system powered by blades driven by a conventional engine or an electric motor, go beyond the fact of leaving the user unprotected, such as in the jet pack, since this consists of very complex equipment that has two large side fans mechanically coupled to an internal combustion engine, resulting in a large, heavy and cumbersome vehicle.

SUMMARY OF THE INVENTION

Aware of the state of technology and the existing gap in this state, the inventor hereof, a person acting in this segment, after studies and research, created the "CAPSULE TYPE FLYING VEHICLE WITH VERTICAL TAKEOFF AND LANDING", object of this patent request, where the form of the vehicle proposed herein is the greatest differential compared to other inventions, since it provides greater stability, considering that its center of gravity is very low, close to the base, is more compact, and guarantees greater safety to the user, who is inside a reinforced structural capsule containing airbag devices, an essential item in these types of vehicles.

This consists of a considerably light device, capable of reaching a velocity of 160 kilometers per hour and with a flight autonomy of around thirty minutes. Capsule propulsion is special and can have three types of propulsion, the first being: two turbojets specifically developed for the equipment, since one of the engines works in spins, i.e., one turns in the opposite direction of the other; the second more sophisticated propulsion option is more economical and sophisticated turbofan engines, but more expensive, which also have spin pairs, and finally, the third option of propulsion consists of special high efficiency compressors driven by high performance batteries and electric motors. In this case, the pairs of compressors also turn in opposite directions so as to nullify the angular momentum effect. The equipment may have models controlled by on-board pilots as well as variations controlled remotely.

The most important aspect of this equipment are two items: the geometric shape of the capsule and the specially designed engines to allow the maneuverability and stability of this equipment specially designed in the shape of a pod or long capsule in the vertical direction with the purpose of accommodating one person, and taking off to fly it through the air by means of a propulsion engine that can either be a turbine, a turbofan or a blade propeller driven by an electric motor.

The equipment in general consists of a complete flight control and stabilizer system, a propulsion engine with a double axis of rotation to cancel out the angular momentum effect, which would cause spinning about its axis, a base upon which the system accessories can be found, such as lubrication pumps, starter fuel source. The fuel tank is located in a section of the pod between the pilot and the propulsion engine, so as to not change the center of gravity of the vehicle as the fuel is consumed.

In the upper portion of the capsule, above the pilot's head, the ballistic parachute system can be found as a means of safety to be used in case of malfunction during the capsule flights, which can be actuated whenever necessary, at altitudes above ten meters, providing safety to the operator during the flight mission.

More specifically, the object of this present patent request consists of a vehicle that flies with maximum safety. Differently from the models known from the state of technology, which offer little safety and leave the pilot exposed to environmental conditions, the product herein presented is closed, keeping its user protected from hostile conditions during flight. Furthermore, it is safe since it presents a series of items that minimize an accident in case the vehicle falls.

The vehicle always flies in the upright position with a slight forward tilt angle, which allows the horizontal displacement in the corresponding direction. Since this is a vehicle having its center of gravity at its base, its stable position is always upright, i.e., in case the vehicle falls it will always fall in the upright position where the base will be the first to touch the ground. Therefore, the skid type landing gear which has a shock absorption function will be the first to absorb part of the impact In sequence, the pilot is buckled to a seat that has vertical displacement and which, in case of a fall, will also absorb a good part of this energy, thus minimizing the impact on the user.

As to propulsion, two propulsion systems are used, one on each side and well above the vehicle's center of gravity as a means of offering greater stability, since the vehicle position will always try to maintain its axis in the upright position. Also, with two independent propulsion systems, the vehicle presents more safety in case of a propulsion malfunction. With only one of the propulsion systems it is possible to reach the ground with minimum impact.

It must therefore be understood that the equipment in question is extremely simple regarding its constructibility and, therefore, easily executable. Nonetheless, excellent practical and functional results are obtained, offering innovative constructibility over known products.

BRIEF DESCRIPTION OF THE INVENTION DRAWINGS

In order to complement this present description so as to obtain better understanding of the characteristics of this present invention and according to the preferred practical execution hereof, a set of drawings, attached hereto, is part of this description in which, for the purpose of exemplification but not limited hereto, the following is presented:

A FIG. 1—Shows an upper-posterior perspective view of the capsule type flying vehicle of vertical takeoff and landing.

Figure 2:
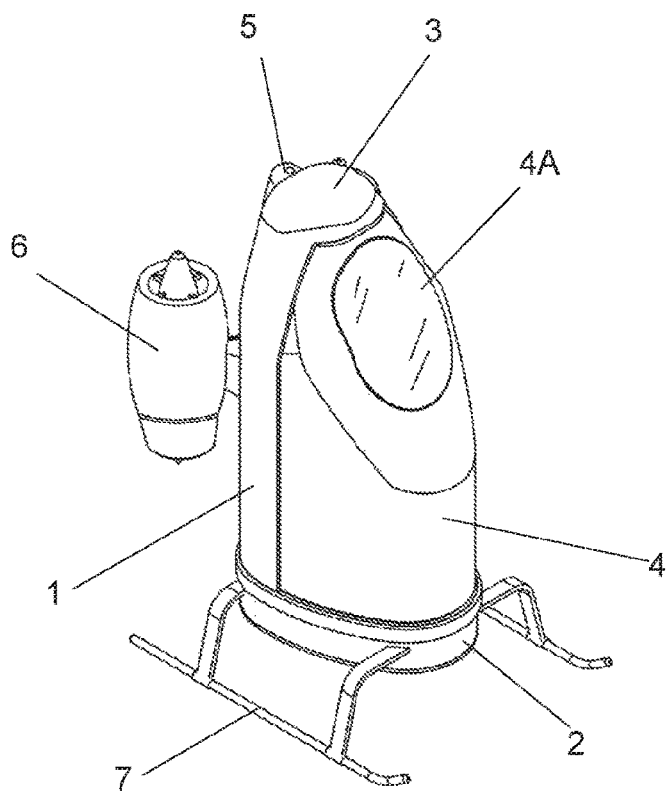

A FIG. 2—Shows an upper-frontal perspective view of the capsule type flying vehicle of vertical takeoff and landing.

Figure 3:
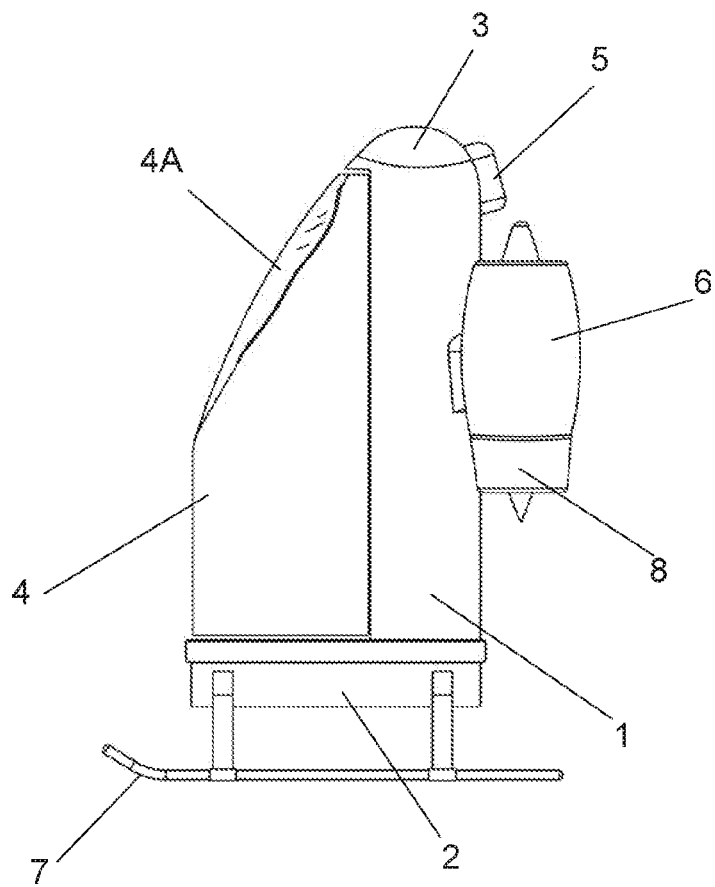

A FIG. 3—Shows a side view of the capsule type flying vehicle of vertical takeoff and landing.

Figure 4:
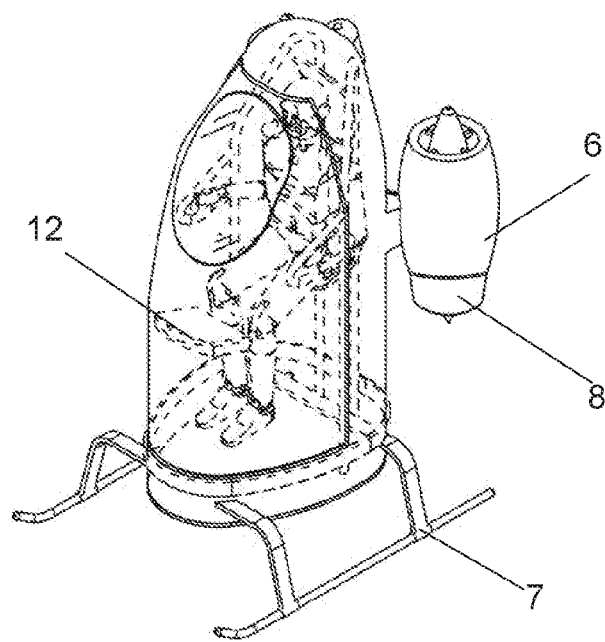

A FIG. 4—Shows an upper-frontal transparent view of the capsule type flying vehicle of vertical takeoff and landing.

Figure 5:
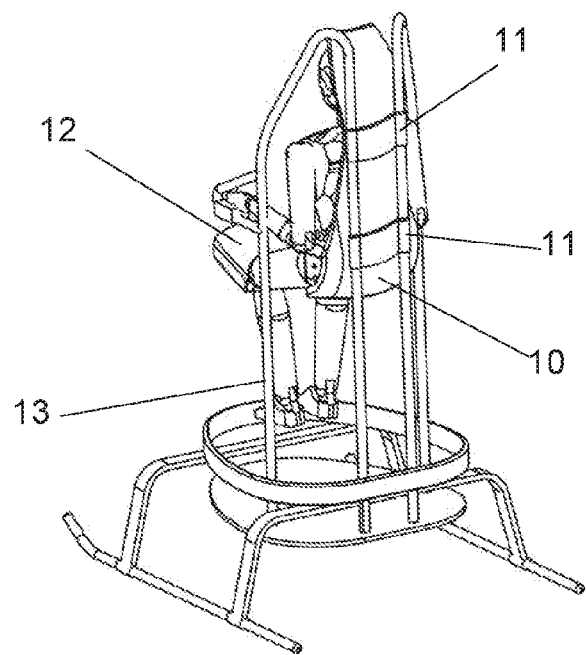

A FIG. 5—Shows an upper-posterior perspective view of the tubular structure and the seat that comprises the interior portion of the capsule type flying vehicle of vertical takeoff and landing, where the pilot and the instruments and control panel are represented, which are assembled on the vehicle door.

Figure 6:
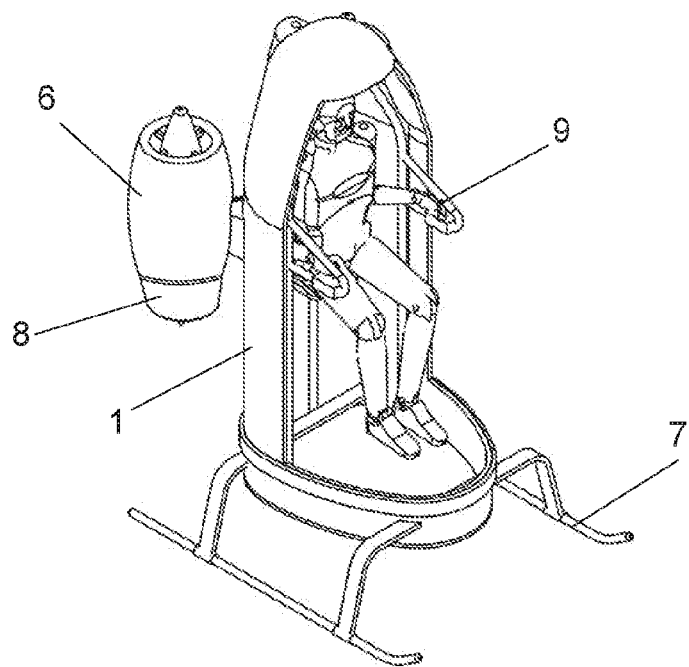

A FIG. 6—Shows an upper-frontal perspective view of the capsule type flying vehicle of vertical takeoff and landing, without the door representation.

Figure 7:
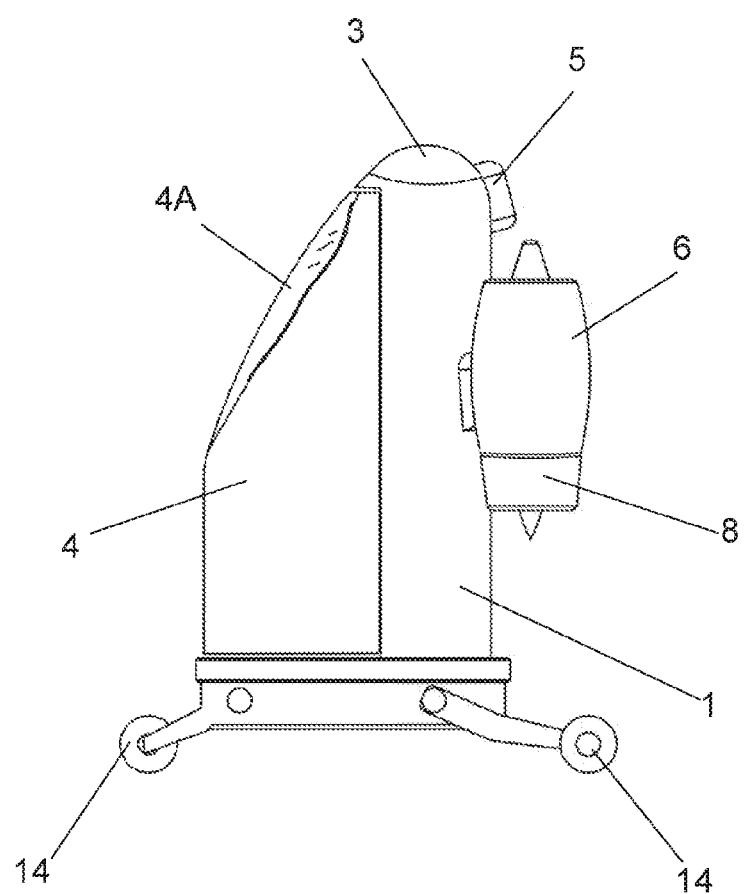

A FIG. 7—Shows a side view of the capsule type flying vehicle of vertical takeoff and landing, equipped with wheels.

DETAILED DESCRIPTION OF THE INVENTION

According to that illustrated in the figures listed above, the "CAPSULE TYPE FLYING VEHICLE WITH VERTICAL TAKEOFF AND LANDING", object of this present patent, consists of a propelled flying vehicle, having an aerodynamic envelope and structure, shaped as an ogive capsule, manufactured using light, reliable, safe and easily controllable material, configured as a jetpod, capable of taking off, landing vertically and hovering, flying and maneuvering over great distances and altitudes.

Basically the capsule type flying vehicle with vertical takeoff and landing consists of a pod-shaped capsule (1) formed by a base (2), head (3) entrance door (4) with a windshield (4A) and a support to affix the propulsion motor.

More specifically, the vehicle has two fixed propulsion systems (6) (it is possible to use just one) of axial flow, encased by aerodynamic nacelles, which allow it to take off from the ground to hover or to fly in aerial displacement. The vehicle thrust is directed by two finned nozzles (8) or control surfaces. A set of control devices operated manually is mechanically connected to these control surfaces, to change the vehicle's heading.

Each control surface is at the outlet of each propulsion system (6) and are independently controlled by means of an array of elements or mechanical joints using two joystick type control levers (9).

These finned nozzles (8) redirect the thrust forward and backward; to the right or to the left of the vehicle, allowing it to execute all types of maneuvers in several directions.

The joysticks (9) also have a device to accelerate or decelerate the propulsion systems, thereby controlling their speed.

The capsule (1) is manufactured using a aeronautical aluminum tubular structure (13), enclosed by a body made of lightweight composite material.

This body forms the cockpit, which provides safety to the passenger or pilot (a two-seat version is possible to transport two people). At the front of the cockpit there is a door (4) made of composite material that allows passenger entry and exit. This door also has the windshield (4A), which protects against adverse conditions during the flight, and a control panel (12) for the user to control the spatial orientation, to orient himself and assess the flight.

Right below the cockpit there is a base platform (2) where several accessories are concentrated, the skid type landing gear, for landings, and the electric batteries.

In the upper pod portion, on each side, there is a pair of propulsion systems (6), which can be electric propulsion systems or mini turbojets. These propulsion systems are installed above the assembly's center of gravity, to produce thrust with directional stability. The pilot is positioned at the center of the pod fastened to a seat (1), which offers vertical movement to better adjust it and absorb shocks in case the vehicle falls.

This light wooden chair is attached to a cradle fixed to the tubular structure (13) made using four vertical tubes and has metallic pivoting sleeves (11), fixed to two capsule columns, for vertical displacement in case of adjustment or shock absorption in case of a low altitude fall not greater than 8 m.

A ballistic parachute (5) is installed on top of the vehicle for use in case of an emergency or malfunction while the vehicle is airborne above an altitude of 8 m.

Operation

The capsule type flying vehicle with vertical takeoff and landing can use various engine configurations: two spin turbojets; two spin turbofans, two spin compressors, four spin compressors, and finally, one double shaft turbofan with spins, i.e., each shaft spins in the opposite direction of the other shaft.

The simplest propulsion model requires just one small turbofan engine that is assembled vertically, with its air inlet turned upwards.

The intake air is divided into two flows. One flow enters the combustion chamber, the other flow ignores the engine and, afterwards, is mixed with the hot turbine gases, cooling them and protecting the pilot against the high temperatures that are generated.

The design of the nozzles makes it possible to move the jet to any side. The kerosene fuel is stored in a tank, next to the engine, fixed to the pod.

The control of the turbojet package is similar for the models using a rocket system, but the pilot cannot incline the entire engine. Maneuvers are done by tilting the levers, the pilot can move the jets of both engines forward, aft or sideways. The pilot turns the lever to the left and right by turning the left wrist. The right identifier governs the engine propulsion.

The engine is started with the aid of a small electric starter motor.

There are instruments to control the engine power and a portable radio to connect and transmit data.

A model was presented to carry just one pilot, but versions with two or more occupants can be developed adopting the same flying capsule concept hereby requested.

With regard to the propulsion systems, propulsion versions using two mini turbojets can be made. This configuration may apply one or two turbojets or even mini turbofans, which produce less noise and consume less fuel.

Optionally, the vehicle may be equipped with landing gear using wheels (14) instead of the skid type landing gear.

The vehicle applications are basically limited initially to the transportation of people (one or two) with a small amount of luggage. Autonomous vehicles can be designed, without the need of passenger operation.

It is certain that when this present invention is put into practice, modifications may be introduced with regard to certain construction and form details, without this implying moving away from the fundamental principals that are clearly substantiated within the content of this claim, therefore being understood that the employed terminology has the purpose of description and not of limitation.

The invention claimed is:

1. A capsule type flying vehicle with vertical takeoff and landing comprising:
    a capsule in the form of a pod, which forms a cockpit, where in a front portion there is a door containing a windshield and a control panel, and below the cockpit is a base platform below which accessories and electric batteries are concentrated; and
    a pair of propulsion systems, positioned side by side, located in the upper posterior portion of the capsule, and
    a ballistic parachute on top of the capsule.

2. The capsule type flying vehicle according to claim 1, wherein the pod is formed by a tubular structure (13) enclosed by a body of composite material.

3. The capsule type flying vehicle according to claim 1, wherein the cockpit has in its interior a fixed seat on a cradle attached to the tubular structure consisting of four vertical tubes and having metallic pivoting sleeves attached to two columns of the pod for vertical displacement and adjustment or shock absorption, and wherein the tubular structure has joysticks for directional control and acceleration and deceleration of the propulsion systems.

4. The capsule type flying vehicle according to claim 1, further comprising fixed, axial flow propulsion engines, enclosed within aerodynamic nacelles, equipped with two finned nozzles or control surfaces (8), where one group of manually operated control devices is mechanically linked to these control surfaces.

5. The capsule type flying vehicle according to claim 1, wherein the vehicle is equipped with a landing gear having wheels a skid type landing gear.

6. The capsule type flying vehicle according to claim 1, wherein the propulsion systems are electric propulsion systems or mini turbojets.

7. The capsule type flying vehicle according to claim 1, wherein the vehicle is equipped with skid type landing gear.

* * * * *